United States Patent
Goeringer et al.

(10) Patent No.: US 11,411,945 B2
(45) Date of Patent: *Aug. 9, 2022

(54) SYSTEMS AND METHOD FOR MICRO NETWORK SEGMENTATION

(71) Applicant: CABLE TELEVISION LABORATORIES, INC, Louisville, CO (US)

(72) Inventors: Steven J. Goeringer, Westminster, CO (US); Brian Alexander Scriber, Lafayette, CO (US); Michael Glenn, Golden, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 197 days.

This patent is subject to a terminal disclaimer.

(21) Appl. No.: 16/835,127

(22) Filed: Mar. 30, 2020

(65) Prior Publication Data
US 2020/0228519 A1 Jul. 16, 2020

Related U.S. Application Data

(63) Continuation of application No. 16/120,063, filed on Aug. 31, 2018, now Pat. No. 10,609,016, which is a
(Continued)

(51) Int. Cl.
*H04L 9/40* (2022.01)
*G06F 9/54* (2006.01)
(Continued)

(52) U.S. Cl.
CPC .......... *H04L 63/0823* (2013.01); *G06F 9/547* (2013.01); *G06F 21/606* (2013.01);
(Continued)

(58) Field of Classification Search
CPC ............ H04L 63/0832; H04L 63/0236; H04L 63/145; H04L 63/20; H04L 63/0272;
(Continued)

(56) References Cited

U.S. PATENT DOCUMENTS 9,215,075 B1 * 12/2015 Poltorak ................. H04L 63/04
9,686,199 B2 * 6/2017 Anand ................ H04L 41/0806
(Continued)

OTHER PUBLICATIONS

Kumar et al., 2012 IEEE, "A Novel Extendible Framework to Efficiently Access Remote Home Equipments on an IMS based MobileTerminal"; (Year: 2012).*
(Continued)

*Primary Examiner* — Khalil Naghdali
(74) *Attorney, Agent, or Firm* — Armstrong Teasdale LLP

(57) ABSTRACT

A wireless communication system includes an external provider subsystem and an electronic network subsystem in operable communication with the external provider subsystem. The electronic network subsystem is configured to provide a first microservice and a second microservice different from the first microservice. The wireless communication system further includes an in-home subsystem (i) separate from the external provider subsystem, (ii) in operable communication with the electronic network subsystem, and (iii) including a first micronet and a second micronet different from the first micronet. The first micronet is configured to operably interact with the first microservice, and the second micronet is configured to operably interact with the second microservice. The wireless communication system further includes at least one electronic device configured to operably connect with one of the first micronet and the second micronet.

20 Claims, 12 Drawing Sheets

Related U.S. Application Data continuation-in-part of application No. 15/443,855, filed on Feb. 27, 2017, now Pat. No. 10,440,043.

(60) Provisional application No. 62/300,641, filed on Feb. 26, 2016, provisional application No. 62/553,216, filed on Sep. 1, 2017.

(51) Int. Cl.
*H04W 12/04* (2021.01)
*G06F 21/60* (2013.01)

(52) U.S. Cl.
CPC ........ *H04L 63/0236* (2013.01); *H04L 63/145* (2013.01); *H04L 63/20* (2013.01); *H04W 12/04* (2013.01); *H04L 63/029* (2013.01); *H04L 63/0272* (2013.01); *H04L 63/0892* (2013.01)

(58) Field of Classification Search
CPC ... H04L 63/029; H04L 63/0892; G06F 9/547; G06F 21/606; H04W 12/04
USPC .......................................................... 726/6
See application file for complete search history.

(56) References Cited

U.S. PATENT DOCUMENTS

| | | | |
|---|---|---|---|
| 2010/0100930 A1* | 4/2010 | King | H04L 63/1433 726/1 |
| 2010/0262988 A1* | 10/2010 | Bauer | H04L 9/0866 380/46 |
| 2011/0302248 A1* | 12/2011 | Garrett | G06Q 20/10 709/205 |
| 2018/0024537 A1* | 1/2018 | Chauvet | G06F 9/50 718/104 |

OTHER PUBLICATIONS

Boussard et al., 2015 IEEE 27th International Teletraffic Congress, "Software-Defined LANs for Interconnected Smart Environments", pp. 219-227 (Year: 2015).*

* cited by examiner

SYSTEMS AND METHOD FOR MICRO NETWORK SEGMENTATION

RELATED APPLICATIONS

This application is a continuation of U.S. application Ser. No. 16/120,063, filed Aug. 31, 2018. U.S. application Ser. No. 16/120,063 is a continuation in part of U.S. application Ser. No. 15/443,855, filed Feb. 27, 2017, which prior application claims the benefit of and priority to U.S. Provisional Patent Application Ser. No. 62/300,641, filed Feb. 26, 2016. U.S. application Ser. No. 16/120,063 also claims the benefit of and priority to U.S. Provisional Patent Application Ser. No. 62/553,216, filed Sep. 1, 2017. The disclosures of all of these applications are incorporated herein by reference in their entireties.

BACKGROUND

Network operators have been dealing with infected subscriber's devices for more than 15 years. Many operators have botnet notification and remediation systems in place to identify and mitigate infected devices on their network. A description of such systems is described in RFC 6561 on Recommendations for the Remediation of Bots in ISP Networks. Such systems have been in production since 2005. One patent for identifying infected devices is described in U.S. Pat. No. 9,027,138.

SUMMARY OF THE INVENTION

Dynamic Software Defined Networking (DSDN) can be used to provide network level security protections for different types of devices, such as a network of Internet of Things (IoT) devices or other systems of wired and or wirelessly interconnected devices.

Devices that no longer have security patches or are infected with malware can be either quarantined, or their network traffic can be limited to only approved network destination points.

For devices with strong security, DSDN can be used to create VPN tunnels to add a layer of defense. For example, DSDN could be used to identify a network connected insulin pump with an embedded Public Key Infrastructure (PKI) certificate, look up the appropriate network connects (doctor's office and/or medical cloud), and create a VPN tunnel to the approved network locations.

In an embodiment, a wireless communication system includes an external provider subsystem and an electronic network subsystem in operable communication with the external provider subsystem. The electronic network subsystem is configured to provide a first microservice and a second microservice different from the first microservice. The wireless communication system further includes an in-home subsystem (i) separate from the external provider subsystem, (ii) in operable communication with the electronic network subsystem, and (iii) including a first micronet and a second micronet different from the first micronet. The first micronet is configured to operably interact with the first microservice, and the second micronet is configured to operably interact with the second microservice. The wireless communication system further includes at least one electronic device configured to operably connect with one of the first micronet and the second micronet.

BRIEF DESCRIPTION

These and other features, aspects, and advantages of the present disclosure will become better understood when the following detailed description is read with reference to the accompanying drawings in which like characters represent like parts throughout the drawings, wherein.

Figure 1A:
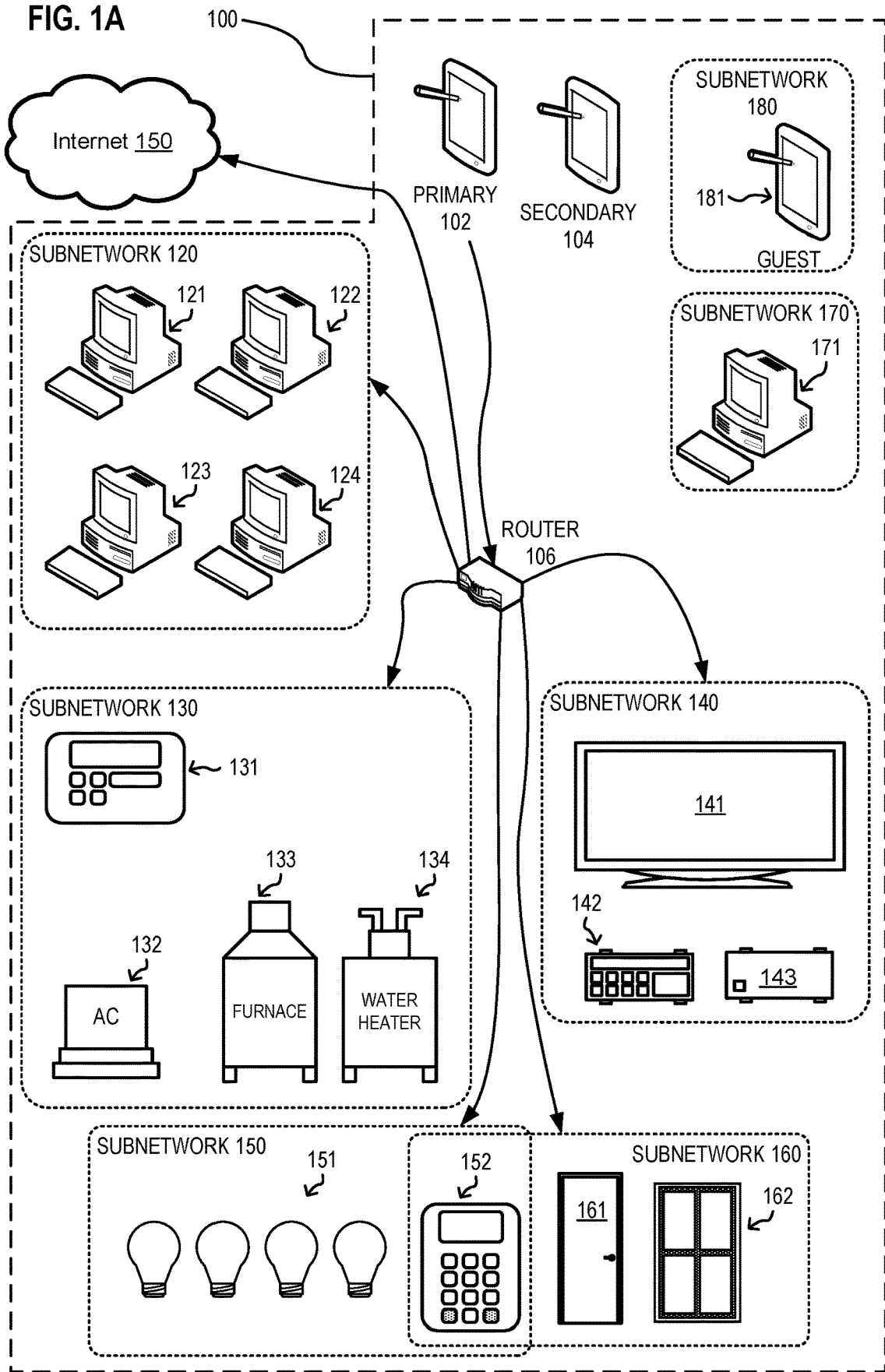
FIG. 1A shows one exemplary Dynamic Software Defined Network (DSDN) connected to the internet, including exemplary subnetworks, and representing primary device communications, in an embodiment.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION OF THE FIGURES

In the following specification and claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

As used further herein, "CA" may refer to a certificate authority hosting a root certificate, and may further include, without limitation, one or more of a CA computer system, a CA server, a CA webpage, and a CA web service.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

The present invention utilizes a subnetwork organization and isolation system and method for protecting computer systems, computing capable devices, and computer networks. This system and method prevents the infections of susceptible devices, dynamically isolates infected devices for administrator notification and manual or automated remediation, and provides for infected devices to remain in use, albeit in a limited fashion, without significant impact to the operator or other devices on the network. Providing for infected devices to remain in use is accomplished by isolating the infected or otherwise vulnerable devices into an isolation subnetwork. One exemplary isolation subnetwork is a limited access subnetwork which only provides for a narrow selection of communications or amount of data to transfer to and/or from the device. Another exemplary isolation subnetwork is a complete isolation subnetwork, which effectively walls of the device from the rest of the network and subnetworks until remediation may occur.

Dynamic Software Defined Networking (DSDN) system can be used to provide bot network level and device level security protections for a wide array of devices and systems, including but not limited to IoT devices, mobile devices, computers, routers, extenders, etc. Devices for which security patches are no longer available or devices that are infected with malicious software, such as malware or botnet software, may be either quarantined or isolated. Alternatively, such devices mayor have their network traffic controlled by the DSDN system, for example, limited to only approved network and subnetwork destination points, to approved network traffic types and/or flows, or by capping the amount of data flow for a predetermined period.

For devices with strong security, DSDN system can be used to create VPN tunnels to add a layer of protection to a devise and devices to which they are connected. In one example, DSDN system identifies a network connected medical device, such as an insulin pump configured with an embedded PKI certificate. The DSDN system determines the appropriate network connects (e.g., a doctor's office and/or a medical cloud), and creates a Virtual Private Networking (VPN) tunnel to the approved network location(s).

In an embodiment, the present DSDN system may create layers of protection for devices by configuring dynamic VPNs to stop malicious traffic from connecting to DSDN system protected devices. Furthermore, privacy is enhanced when utilizing the present DSDN system to preventing the theft of data from snooping devices listening to network traffic. This is accomplished, for example, by isolating devices in a home Wi-Fi environment and by utilizing VPN Tunnels (e.g., GRE or IPSEC). These snooping devices may be standalone devices put in place by a third party or may have been installed by the owner of the network but taken over (e.g., infected with snooping software) by a malicious third party. Such infected devices may be quarantined by the present DSDN systems and methods such that the device's network traffic is partially or completely separated or otherwise isolated from that of other devices on the network and potentially the internet.

If a network operator maintains a botnet notification and remediation system any infected device traffic may be tunneled for an administrator (also called here, "a user") notification and remediation. For infection susceptible devices, for example, that are no longer supported with security patches, the device's network traffic may be dynamically configured to only route to approved locations, one example of which is an over-the-top video provider, the device's manufacturer, etc.

The present technology is not limited to the home use and may also be applied by any network operator and their operation.

The present invention may also provide a customer of a video network operator with an improved broadband experience. For example, for IPTV or over-the-top video services, the present system and method provides functionality to minimize the impact that home network traffic has on the video experience. It may also reduce operating costs associated with infected devices providing a network environment which they may exist in while protecting the rest of the network from infection.

FIG. 1A shows a DSDN 100 (also call "network 100" herein) connected to the internet 190 and including exemplary subnetwork 120-subnetwork 180 (also called "limited access networks"), a router 106, a primary interconnected device 102, and a secondary interconnected device 104. Primary device 102 is pictorially represented as connected to subnetwork 120-subnetwork 160 via router 106. Subnetwork 120 includes four computer systems 121-124. Subnetwork 130 includes a smart thermostat 131, a smart AC unit 132, a smart furnace 133, and a smart hot water heater 134. Intelligence in these (and any other) devices may be integrated upon manufacture or may be added as an add-on post manufacture. Subnetwork 140 includes a smart TV 141, an A/V receiver 142, and an amplifier 143. Subnetwork 150 includes smart light bulbs 151 and a smart hub 152. Subnetwork 160 shares smart hub 152 with subnetwork 150 and includes IoT enabled door 161, and window 162. Any of these devices may include a plurality of IoT or smart devices, for example door 161 may include a smart lock, a smart doorbell, and a smart door opening sensor. Subnetwork 150 and/or subnetwork 160 may also include other smart or IoT devices such as smart light and fan switches, motion detectors, security cameras, moisture detectors, window shades, weather stations, etc., all of which are not shown but are contemplated. Subnetwork 170 includes a computer system 171. Subnetwork 180 includes a guest device 181, such as but not limited to a guest smart phone, guest computer system, or guest tablet.

Communication may come directly from primary device 102 to a subnetwork or a member of a subnetwork, or may be facilitated by networks 100's router 106. In the example of FIG. 1A, DSDN 100 is configured such that primary device 102 may access subnetwork 120-subnetwork 160 via router 106. Secondary device 104 has not been provisioned into network 100, and therefore is not in communication with any device or subnetwork within network 100. Subnetwork 170-subnetwork 180 are shown isolated from all other subnetworks/devices in network 100. That is, there is no communication between isolated subnetworks 170 and 180 and any other device or the internet 190. In one example, for subnetwork 170 this may be that computer device 171 is infected with malicious software. In another example, for subnetwork 180 this may be because guest device 181 is currently not trusted.

In the embodiment of network 100, all devices within a subnetwork may intercommunicate with other devices in the same subnetwork, but are partially or wholly isolated from devices outside their respective subnetwork, unless device or subnetwork is specifically configured to communicate with a device or subnetwork outside the respective subnetwork. One example of a cross subnetwork communication is subnetworks 150 and 160, which share smart hub 152. In this embodiment, smart light bulbs 151 may communicate with smart hub 152 and door 161 and window 162 may communicate with smart hub 152, but smart bulb 151, door 161 and window 162 may not communicate with each other. In a separate embodiment smart hub 152 (or router 106) may act as a policy enforcing intermediary which only allows certain communications between devices in subnetwork 150 and subnetwork 160. Such communications may be maintained in a list of allowed communications on smart hub 152 or router 106 or enforced utilizing known techniques. Another example of cross subnetwork communication is between subnetwork 160 and subnetwork 130. For example, if door 161 and window 162 are open, communication and coordination between subnetworks 160 and 130 may be initiated to heat or cool a home in which network 100 exists. For example, hub 152 may communicate with primary device 102 to notify the user that heating is not optimized due to open windows and or doors.

It will be understood that subnetworks may be organized by device type such that only devices that should communicate with one another do so and device that are not design to communicate with one another do not. For example, subnetwork 130 may be considered an HVAC subnetwork which supports heating and air conditioning smart devices and subnetwork 140 may be considered an Audio/Video subnetwork which supports only AV equipment. If, for example, smart furnace 133 were infected with foreign or malicious software which tried to duplicate itself throughout DSDN 100 the subnetwork structure of DSDN 100 would limit the malicious software to only subnetwork 130. Furthermore, if furnace 133 tried to communicate with receiver 142 for purposes of duplicating itself, then DSDN 100 would note the unusual communication attempt and may initiate an analysis of furnace 133, which may result in further isolation and remediation prior to incorporating furnace 133 back into subnetwork 130.

It will be understood that the present system and method may be implemented on a service provider (e.g., Comcast) implemented DSDN capable system or in a DSDN cloud. DSDN functionality may also be distributed between a service provider the service provider implemented system, the DSDN cloud and the DSDN capable router.

Figure 1B:
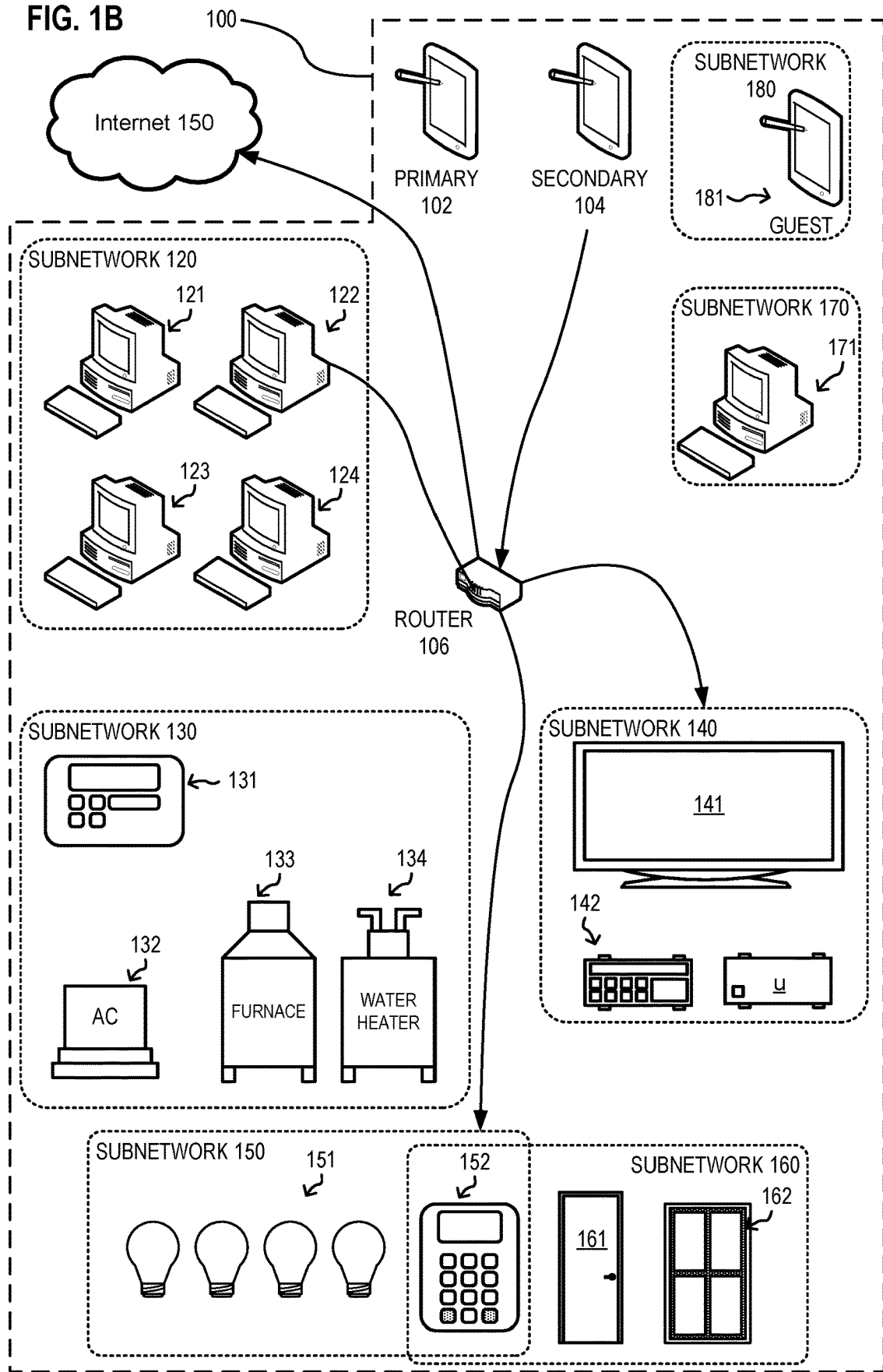
FIG. 1B shows the DSDN of FIG. 1 with secondary device communication connections represented after the provisioning of a secondary device, in an embodiment.

FIG. 1B shows DSDN 100 of FIG. 1 with communication connections for secondary device 104 after device 104 is provisioned into network 100. DSDN 100 provides device 104 with communication to computer 122 of subnetwork 120, to subnetworks 140 and 150, and the internet all via router 106. Secondary device 104 may be, for example, a child who lives in the home in which DSDN 100 in implemented. Because of this, device 104 is not provided access to house hold systems such as the HVAC system supported by subnetwork 130. Furthermore, device 104 is only provided access to computer 122, which may be, for example, the child's computer. It will be understood that DSDN 100 is a dynamic network such that access for device 104 may be changed and that change may be DSDN 100 implemented or may be manually configured by an administrator, for example by the user of primary device 102.

Dynamic reconfiguration of DSDN 100, subnetworks 120-180, and communication access may be triggered by a DSDN operated scheduler. One example of this type of scheduling is primary device 102 programming device 104's access to devices or subnetworks within DSDN 100. This may include restricting device 104's access to AV subnetwork 140 on school nights to after 6 PM. Alternatively, or additionally, device 104's access to devices or subnetworks within DSDN 100 may be event driven. One example of such an event driven control is the submission or upload of the child's homework via device 104 or computer 122 to a homework submission website or server which may cause DSDN 100 to provide device 104 access to AV subnetwork and optionally to provide computer 122 broader access to the internet and access to e-mail, text, etc. Another example is the detection of malicious software on one or more devices of DSDN 100 or within a subnetwork 120-180. Another example is the notification by a trusted source, e.g., manufacturer of thermostat 131, that a software update is available.

Figure 1C:
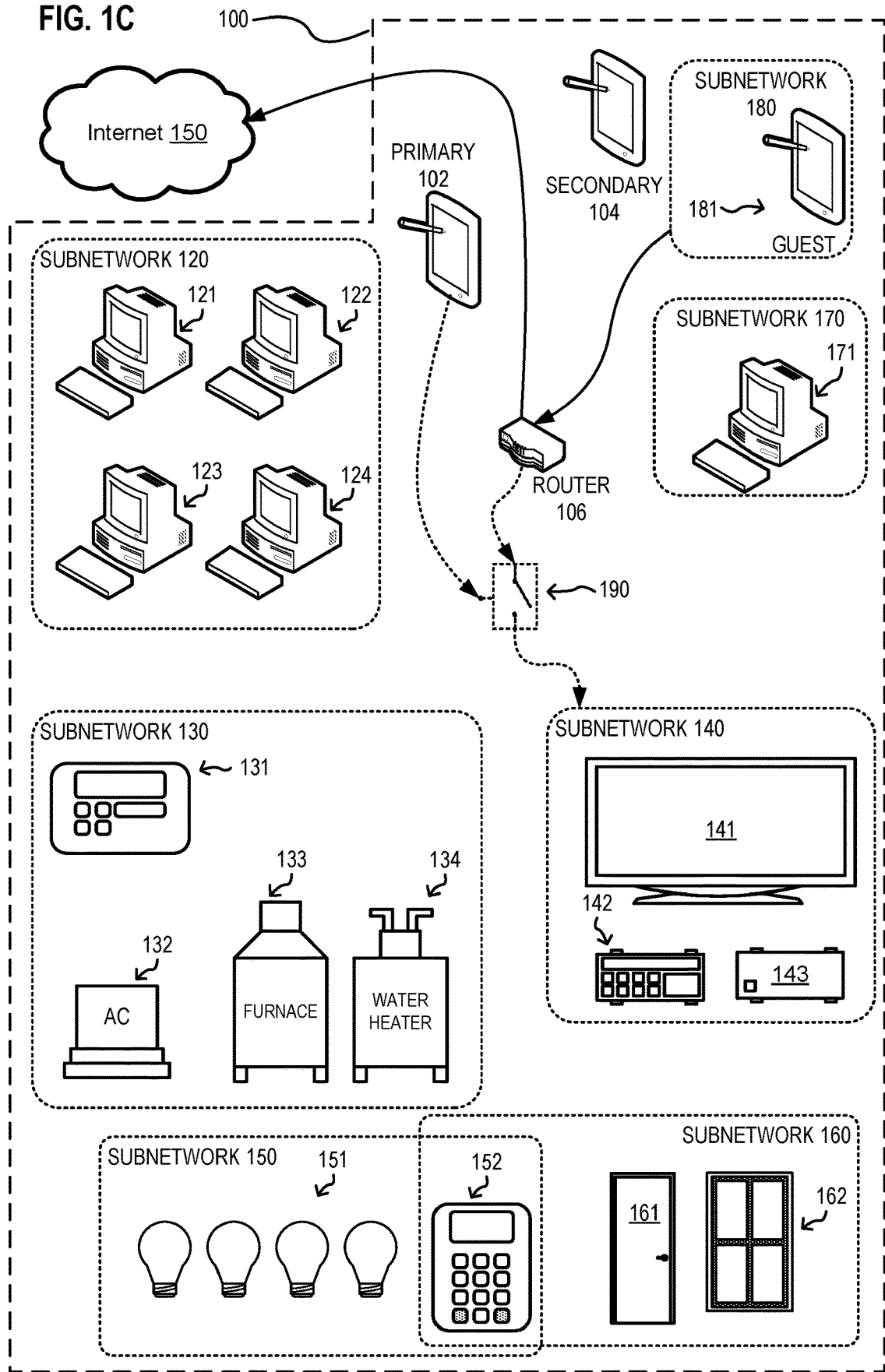
FIG. 1C shows the DSDN of FIG. 1 with guest device communication connections represented after the provisioning of a guest device into the DSDN, in an embodiment.

FIG. 1C shows DSDN 100 of FIG. 1 with communication connections for guest device 181 after guest device 181 on subnetwork 180 is provisioned into DSDN 100. FIG. 1C also includes a symbolically represented switch 190, discussed further below. Because device 181 is a guest device it is provided limited access to DSDN 100 support devices and subnetworks. This is to protect DSDN 100 devices and subnetworks from potential infection that may be introduced by guest device 181. This also protects guest device 181 from any viruses or malicious software that may be on a DSDN 100 device, for example furnace 133.

In FIG. 1C guest device 181 is provided access to the internet 190 and access to AV subnetwork 140. Guest device 181 is provided primary device 102 controlled access to subnetwork 140. Control by primary device 102 is symbolically represented by device 102 controlling switch 190. Switch 190 may be implemented as a physical switch, as software within router 106, or by another system or method that would be apparent to one skilled in the art after reading the present disclosure.

Figure 2:
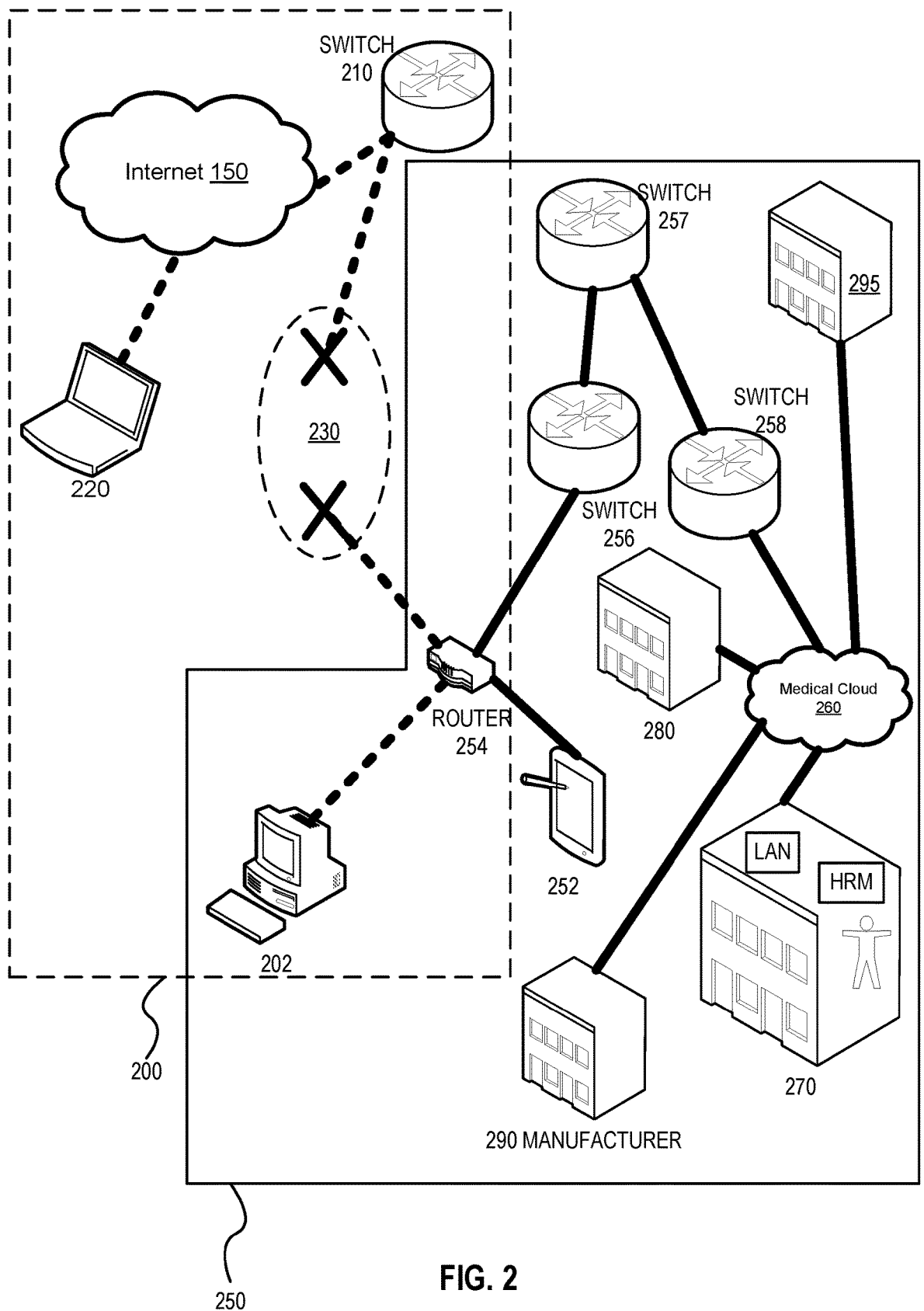
FIG. 2 shows a medical subnetwork in communication with a residence subnetwork, which utilizes a partial isolation protocol, in an embodiment.

FIG. 2 shows two subnetworks, subnetworks 200 and 250, which are examples of subnetworks forming communication subnetworks, such as subnetwork 250, and an isolation subnetworks, such as subnetwork 200.

Both subnetworks 200 and 250 are formed of devices which are in communication via router 254, but are not co-located. In the example of subnetwork 250 a device 252 is in communication with a medical cloud 260, a doctor office 270, a hospital 280, device manufacturer 290, and service provider (e.g., Comcast) via a router 254 and switches 256-258, which together form an isolated subnetwork 250. Such a connection may utilize a VPN to connect a computer 202 and doctor's office 270, thereby forming a new network, not shown. This new network may include medical devices, such as an insulin pump (not shown), which may be controlled or monitored from one or both of medical cloud 260 and doctor's office 270. The present system and method provides for spatially distributed devices to exist on the same secure network (and in some case on different networks) with limited to no risk of the system being compromised by at least reducing the network attack surface.

Subnetwork 200 forms one embodiment of an isolate subnetwork, formed of a computer 202, a switch 210, computer 220, and router 254, which is share with subnetwork 250. Subnetwork 200 is shown with a symbolic disconnect 230 between switch 210 and router 254, which isolates computer 220 from computer 202 and subnetwork 250. This may be a physical disconnect, for example implemented by a switch like switch 210, or may be implemented in software, for example within router 254, a DSDN orchestration, by a VPN tunneling, or by a combination of any of these.

In an alternative embodiment (not shown), computer 220 may be placed in an isolation subnetwork that is separate from one or both of computer 202 and switch 210 and subnetwork 250.

Figure 3:
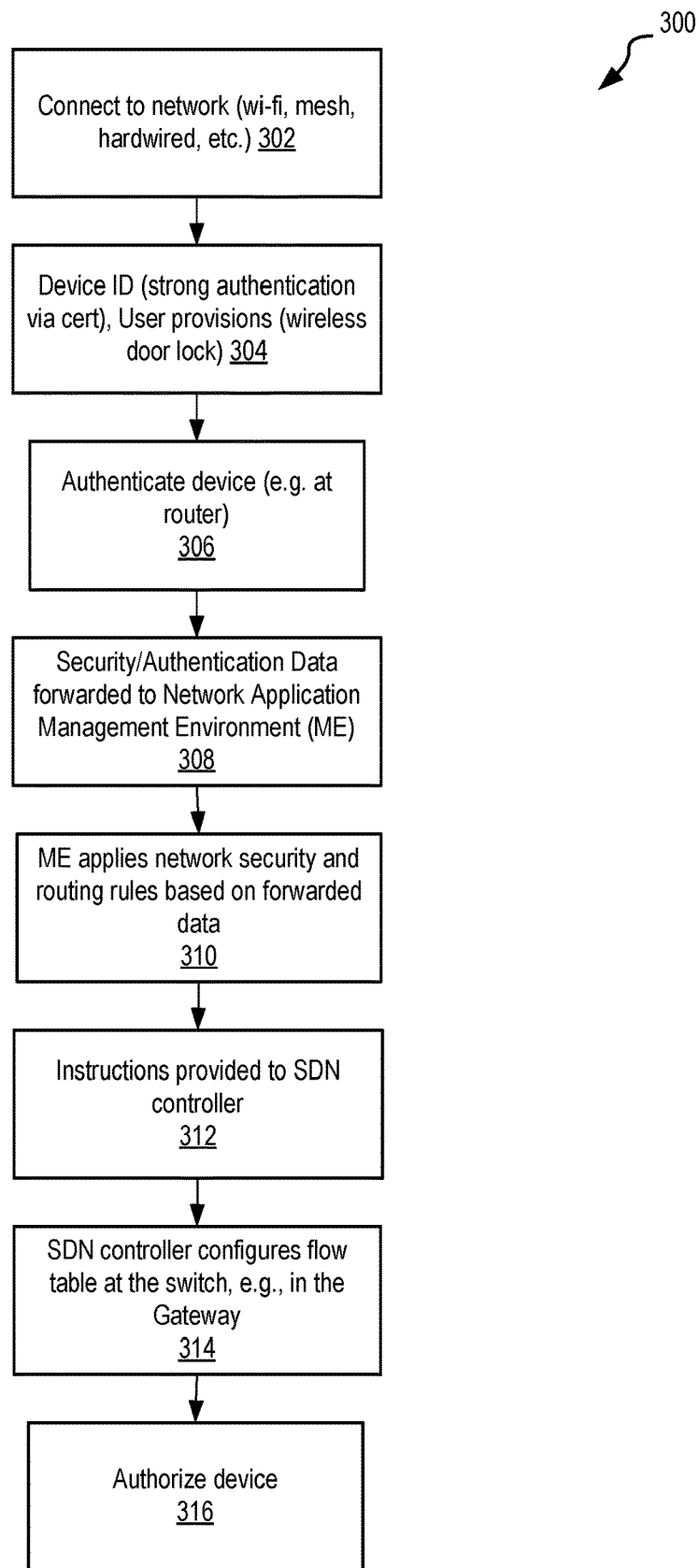
FIG. 3 shows one exemplary provisioning process, in an embodiment.

FIG. 3 shows one exemplary provisioning process 300 for provisioning a new device onto a DSDN.

In step 302 of method 300 a device to be provisioned (hereinafter, "the device") is connected to the network via a wireless or wired connection. One example of step 302 is guest device 181 of FIG. 1C wireless connection to router 106 of DSDN 100.

In step 304 of method 300 authentication data from the device is transferred to a DSDN capable system.

This step may be the transfer of a strong authentication via a cert or may be accomplished by a manual process performed by the administrator of the DSDN. One example of step 304 is transmitting a strong authentication via a certificate or SIM card or user name and password to router 106, the user's service provider, or a DSDN cloud service. In step 306 of method 300 step 304 data is utilized to authenticate the device. One example of step 306 is DSDN capable router 106 connecting to internet 190 to authenticate guest device 181 via the provided cert.

In step 308 of method 300 the security/authentication data is forwarded to a network application management environment for processing. One example of step 306 is guest device 181's cert, username and password data, or SIM card data being forwarded to router 106, the use's service provider, or a DSDN cloud service.

In step 310 of method 300 the management environment applies network security and routing rules to guest device 181 based on the provided data. One example of step 308 is router 106, the use's service provider, or a DSDN cloud service generating instructions for guest device 181 within network 100 to limit access by guest device 181 to network 100 resources.

In step 312 of method 300 instructions are provided to DSDN controller based on the data provided and processed in the above steps. One example of step 308 is router 106, the use's service provider, or a DSDN cloud service providing the generated instructions to network 100 to implement the instructions.

In step 314 of method 300 a DSDN controller configures a flow table at a switch, e.g., in a gateway or a router. One example of step 312 is a DSDN controller within DSDN capable router 106 configures a flow table within router 106 to control data flow to and from guest device 181.

In step 316 of method 300 the device is authorized. One example of step 316 is guest device 181 being authorized by DSDN capable router 161, the user's service provider, or a DSDN cloud service.

Figure 4:
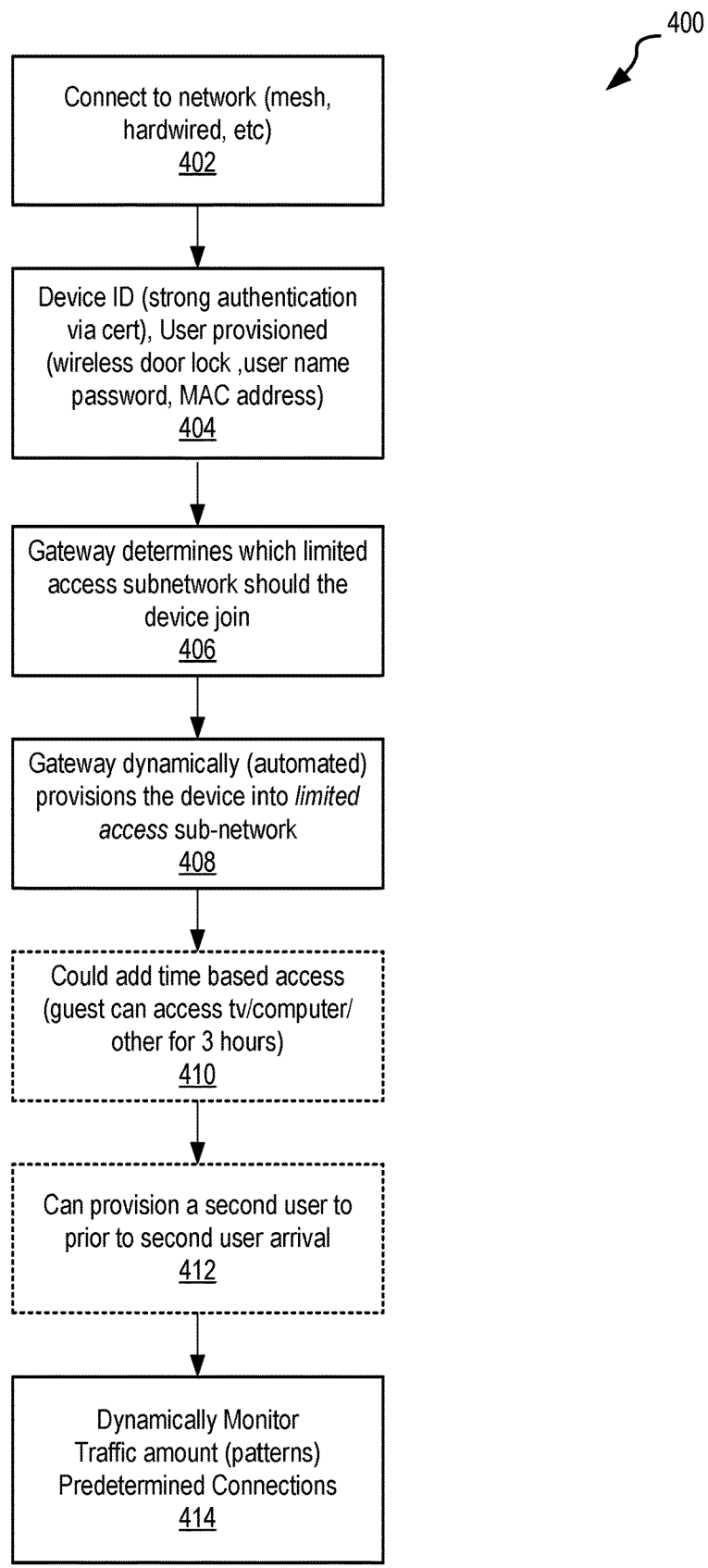
FIG. 4 shows another exemplary provisioning process, in an embodiment.

FIG. 4 shows another exemplary provisioning process, process 400, for provisioning a new device into a DSDN such as DSDN 100 of FIGS. 1A-C. The bulk of the examples here are directed to a wireless door lock.

In step 402 of method 400 a device to be provisioned (hereinafter, "the device") is connected to the network via a wireless or wired connection. One example of step 402 is connecting a wireless door lock associated with door 161 of FIG. 1A to router 106 of DSDN 100.

In step 404 of method 400 authentication data from the device is transferred to the DSDN system, where the authentication data is processed. Transferring authentication data may be automatically or manually transferring a strong authentication via a cert or may be accomplished by an automatic or manual process performed by the administrator of the DSDN, for example, relying on user name and password, MAC address, or some other mechanism known in the art. One example of step 304 is the device transmitting its cert. to the router which in turn forwards the cert to the user's service provider, where the cert is processed and the device is authenticated.

In step 406 of method 400 the user's service provider, a gateway, or some other DSDN capable device determines which limited access subnetwork the new device will exist in. One example of step 306 is DSDN capable router 106 or user's service provider determining that a new door 161 associated door lock will exist within subnetwork 160.

In step 408 of method 400 the DSDN capable device dynamically provisions the device into the step 406 determined limited access subnetwork. One example of step 408 is DSDN capable router 106 associating door 161 associated door lock with subnetwork 160.

In optional step 410 of method 400 the association is given a temporal limitation, for example, the association expires after a predetermined amount of time or can only be accessed by designated devices or user during predetermined time periods. One example of optional step 410 is providing guest device 181 with a time based expiring access to DSDN 100. In another example of step 410, DSDN capable router 106 provides access to AV subnetwork 140 only between 6:00 PM and 7:00 PM on week nights.

In optional step 412 of method 400 the device is provisioned while the device is remote from DSDN 100 and router 106. This provides for the device to have immediate access to resources within DSDN 100 when it is within wireless communication distance from router 106 or when it is plugged into router 106. Examples of optional step 412 include remotely accessing router 106 and/or DSDN 100 to provision door 161 associated wireless door lock at time of purchase or guest device 181 in DSDN 100 or an appropriate subnetwork.

In step 414 of method 400 DSDN dynamically monitor s traffic amount and/or patterns to predetermined connections to ensure proper functioning and to determine the presence of undesired software within the DSDN. One example of step 414 is DSDN capable router 106 monitoring all traffic within DSDN 100 to if traffic amounts and patterns vary that that expected the be DSDN configured devices. If it is determined that traffic amounts and/or patterns do vary from that expected, DSDN capable router 106 may initiate an analysis of the infringing device to confirm the presence of malicious software. If malicious software is found, remediation process are activated, such as isolating the device to an newly generated isolation subnetwork, which restricts or eliminates traffic flow depending on the necessity of the device. Malicious software removal steps may also be taken.

Figure 5:
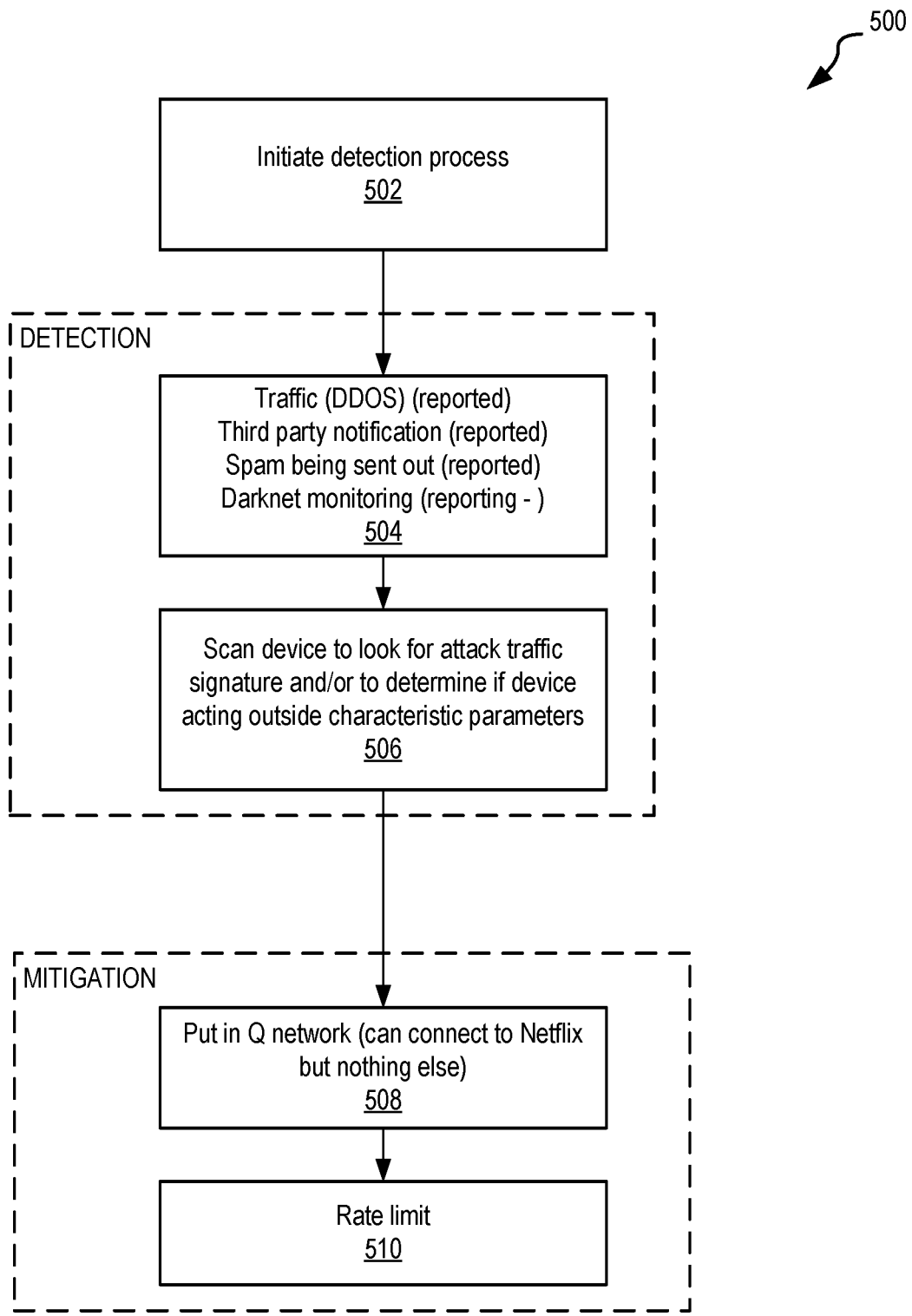
FIG. 5 shows one exemplary remediation process, in an embodiment.

FIG. 5 shows one exemplary remediation process 500, for remediating a device within the DSDN that is determined to have been infected by malicious software.

In step 502 of method 500 initiates a detection process to determine if a device is infected. One example of step 502 is router or service provider implemented DSDN system initiates a scan or monitoring of a device, subnetwork or network.

In detection step 504, method 500 utilizes third party data to determine if the device is infected. Third party data may include, but is not limited to, a report of DDOS involved computers, a report Spam involved computers, third party notifications, and computers identified during a Darknet monitoring process. One example of step 504 is a user's service provider comparing the device to one or more of the above described lists.

In detection step 506, method 500 monitors and attempts to determine if the device is infected by comparing a devices traffic and operating characteristics with a predetermined baseline device, monitoring traffic for comparison to the traffic signature of known malicious software, and/or to determine if the device is acting outside it characteristic traffic. One example of step 506 is router 106 or a service provider determining if the device is infected by comparing a device's traffic and operating characteristics with a predetermined baseline device, monitoring traffic for comparison to the traffic signature of known malicious software.

In mitigation step 508 of method 500 places the device in a limited traffic or isolation subnetwork. One example of step 508 is the router of the service provider forming and placing a smart TV with malicious software into a limited access subnetwork such that the smart TV may only access Netflix and the smart TV manufacturer.

In mitigation step 510 of method 500 rate limits the device. One example of step 510 is the DSDN capable router or service provider placing a smart light bulb into a traffic rate limited subnetwork such that a minimal amount of data can be sent from the smart light bulb.

Figure 6:
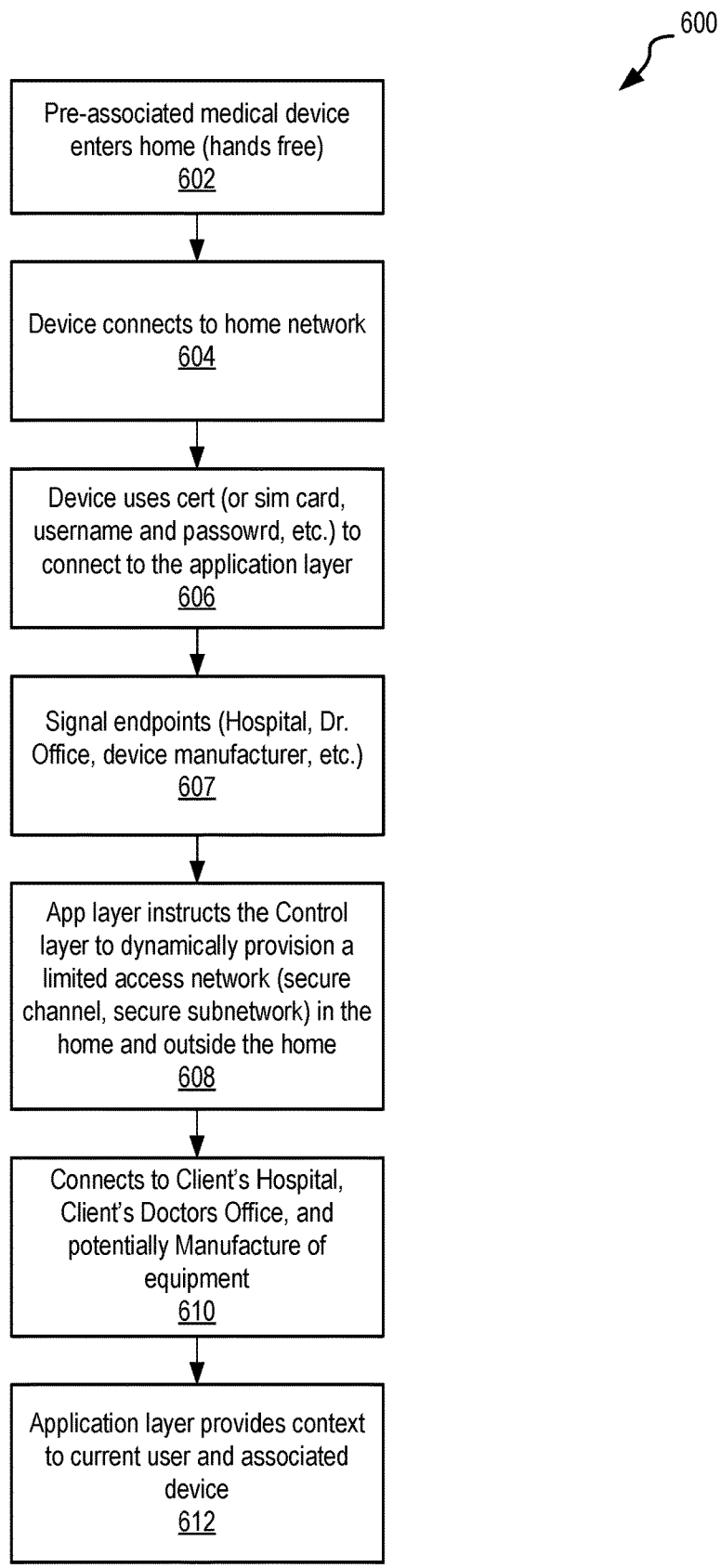
FIG. 6 shows one exemplary process for the provisioning of a headless device onto a DSDN, in an embodiment.

FIG. 6 shows a method for the provisioning of a headless device onto a DSDN. The headless device described in FIG. 6 is a medical device, such as a wirelessly capable insulin pump. It will be understood that the medical device described here is only meant to be one example of one possible headless device and not limiting in any way. Other headless devices may also be provisioned utilizing method 600 without departing from the scope herein.

In step 602 of method 600 a headless medical device enters a patient's home which is enabled with a DSDN. One example of step 602 is a patient bringing a wireless capable insulin pump into their home and powering the device on.

In step 604 of method 600 the medical device automatically connects to the DSDN. One example of step 604 is the insulin pump wirelessly connecting to the patient's DSDN.

In step 606 of method 600 the medical device utilizes a digital cert to connect to the application layer. One example of step 606 is the medical device transmitting its digital cert to router 106 of FIG. 1A or the user's service provider for processing.

In step 607 of method 600 one or more of the device, the service provider, and the medical cloud provides data regarding the endpoints for the distributed network. One example of step 607 is the router, service provider, or medical cloud identifying the patient's hospital, the patient's doctor's office, and the medical device's manufacturer as the only endpoints within the distributed network.

In step 608 of method 600 the application layer signals the control layer of the DSDN capable router to dynamically provision a limited access network or subnetwork, for example with a secure channel and/or with a secure subnetwork, in the patient's home and outside the patient's home. That is a subnetwork is formed between two remote networks such that they operate as a single network, in this example as a medical network which includes an insulin pump in a patient's home and a medical facility or monitoring service, for example at a doctor's office, that monitors and send and transmits data to the insulin pump. This medical network may also include a medical cloud service, similar to that shown in FIG. 2, and the manufacturer of the medical device. This greatly reduces the attack surface of the insulin pump and provides important information to a medical monitoring service or doctor's office.

In step 610 method 600 the insulin pump connects to the patient's doctor's office and/or the medical monitoring service, and potentially the manufacture of medical device. One example of step 610 is the insulin pump connecting to the patient's doctor's office such that the doctor may have real time information about the patient, to a medical monitoring service such that the patient may be monitored 24 hours a day, and to the manufacturer of the insulin pump such that any patches or updates may be timely provided, all over a secure network formed by the DSDN systems and method described herein.

In step 612 of method 600 the application layer provides context to the user, e.g., the patient, and any associated device. Providing context to the user may be providing information regarding the device's endpoints, traffic limitations, etc.

Micro Network Segmentation and Extension for Security and Service Enablement

The isolation network systems and methods described above thus represent particular embodiments within the larger context of the innovative micro network systems described herein, also referred to as micronetworks or micronets. The rapid growth in the number of connected devices (e.g., the IoT) has created new security risks for the networks (both wired and wireless) with which the devices seek connection. In particular network, for example, might not be put at risk to allow the device access some network services (e.g., public open Internet), but not other services (e.g., subscriber private, Enterprise secure, etc.). Accordingly, the embodiments herein describe innovative creation and management of micronets within a greater multi-level network system. The micronets establish and maintain different levels of access for a device that it is connected, or is seeking connection, to the system based on the trust level for the device.

Micronet operation is thus different from conventional network access techniques that simply function as gatekeepers for allowing/disallowing devices to connect with a network. In these conventional systems, devices are either entirely allowed, or completely disallowed, access to the network based on whether can pass through the security "gate" of the network, whether virtually (e.g., password credentials) or physically (e.g., locally connected within a given server system). Some such conventional techniques are able to dynamically limit the number of devices that access the network, and restrict access to fewer devices when the network resources become overloaded, but these techniques are not known to be able to limit the level of access by a device that is already connected to the network. This all-or-nothing approach fails to address the complexities of the present rapidly-increasing world of connected devices and overlapping networks.

For example, some electronic connected devices are general purpose devices (e.g., smart phones, tablets, personal computers, etc.), which have advanced user interface capability that allows network selection and credential input (e.g., as username and password) to be made manually. Other electronic connected devices are purpose-built devices (e.g., medical devices) which may not have user interface capability for network selection or entering credentials for secure authentication. Where a connected electronic device is a purpose-built medical device, and located in a clinical setting (e.g., a hospital), the device may not be considered sufficiently trusted to access certain portions of the clinical network (e.g., secure Enterprise services, private hospital records, medical service applications), but may nevertheless need to connect with other portions of the clinical network to upload vital patient health information recorded by the device. If such a device is infected with malware, for example, it is important to prevent that devices from accessing secure portions of the network, but it is still critical that the network be able to access the vital health records recorded by the device.

The mobility of many connected devices creates additional security concerns to present networking architectures and techniques. In the case of medical devices, many such devices may be considered secure and trusted when initially provisioned in the clinical setting, but may become less secure, or even untrusted, when brought into a home network environment. Devices connected to a home network were considered significantly more vulnerable once they are connected to the Internet. Furthermore, home networking systems are becoming increasingly more complex, and many users do not, or are unable to, manage their own home network. Indeed, the typical user of a home network is not aware of what, or how many, devices are connected to the Internet through home network of the user.

Selecting which, and/or how many, devices connect to a network is rarely organized as an automated process, and the selection process is often manually intensive. Furthermore, it is particularly challenging for the typical home user to provide secure connectivity to providers of critical exterior services (e.g., healthcare, automotive, etc.). The consequence thereof, the remote services delivered by exterior service providers do not often result in a good user experience.

According to the innovative systems and methods described herein, home networks are automatically and dynamically segmented into the trust domains of micronets in order to provide automatic secure connections to services outside of the home settings. In an exemplary embodiment, individual devices may be identified using certificates, dynamic certificates, heuristics, and/or analytics, and then correspondingly put into one or more trust domains appropriate for the device use. As described above, when individual device need not be restricted to use within only one network, subnetwork, or micronet. In some embodiments, a home user is prompted for permission for a device to connect, to ensure controlled by the home user. In other embodiments, home network attachment may occur automatically, according to the trust conveyance techniques described herein, including without limitation, certificates and dynamic certificates to automatically assign home devices into trust domains.

In an exemplary embodiment, SDN and/or DSDN is implemented to establish the secure connection to services exterior to the home network. In at least one embodiment, the SDN/DSDN further utilizes a registry service. Through these advantageous systems and methods, a device may connect to various micronets within a home environment according to a level of trust associated with the device itself, and/or security levels of the exterior services with which the device may be used. The present embodiments are therefore advantageously useful with respect to conventional networks, structured Cloud-based networks, and multi-level networks (e.g., containing public-open, provider-secure, subscriber-private, etc. access levels).

Figure 7:
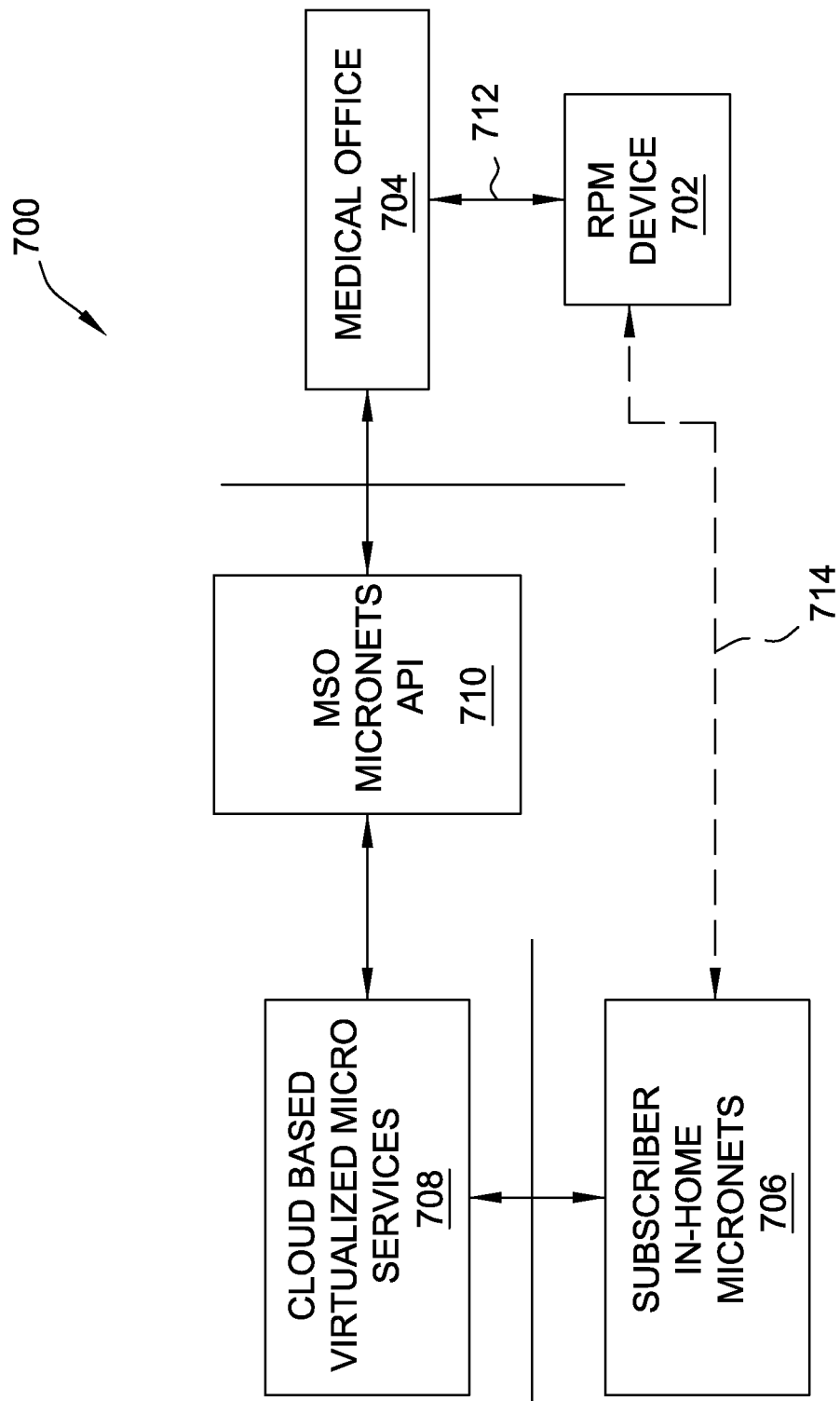
FIG. 7 is a schematic illustration of an exemplary micronetwork management system, in an embodiment.

FIG. 7 is a schematic illustration of an exemplary micronet management system 700. In an exemplary embodiment, system 700 includes an electronic device 702 configured to be capable of connecting with one of an external service provider subsystem 704 and an in-home subsystem 706. In the exemplary embodiment, in-home subsystem 704 is configured to access virtualized micro services (described further below with respect to FIG. 8) from a Cloud-based subsystem 708, which is configured to interact with external service provider subsystem 704 through a micronet application programming interface (API) subsystem 710. In the example illustrated in FIG. 7, external service provider subsystem 704 represents a medical or clinical setting, an electronic device 702 is a remote patient monitoring (RPM) device. These examples are provided though, for purposes of illustration, and are not intended to be limiting. As described above, the embodiments herein are applicable to other types of external service providers and connected electronic devices (e.g., general-purpose, purpose-built, etc).

Although not illustrated in FIG. 7, micronet API subsystem 710 may, for example, include one or more of an application server, an authentication, authorization, and accounting (AAA) server, and a Wi-Fi core unit with online signup (OSU) and an access point (AP). In some embodiments, micronet API subsystem 710 is associated with a multiple-system operators (MSO), and may represent API protocols and/or functionality for client-server or socket programming, remote procedure calls, Simple Object Access Protocol (SOAP), REpresentational State Transfer (REST), and/or other Web service APIs. Cloud-based subsystem 708 may, for example, include or connect with an electronic network, such as the Internet, a Cloud-based network, or another form of electronic network, such as a local area network (LAN) or wide area network (WAN), and in some embodiments, the Wi-Fi core unit may be configured to communicatively connect with the AAA server in the electronic network. Communicative connections from the Wi-Fi core unit may be wireless, or wired, e.g., fiber, cable, or Ethernet. Additionally, as described above with respect to the preceding embodiments, and further below with respect to FIGS. 8-9, in the exemplary embodiment, in-home subsystem 706 further includes SDN capability.

In exemplary operation of system 700, device 702 may be subject to an original provisioning operation 712 by, or at the location of, external service provider subsystem 704, and then later subject to an installation or in connection operation 714 with, or at the location of, in-home subsystem 706. Alternatively, device 702 is initially provisioned or re-purposed by/at in-home subsystem 706. In either case, system 700 enables device 702 to be assigned, using certificates/dynamic certificates through in-home subsystem 706, to a trust domain of one or more micro services provided by Cloud-based subsystem 708. By this innovative use of certificates, in-home use of device 702 may be securely assigned to the trust domain(s) automatically, without requiring any active input from the home user. Conventional device attachment techniques do not use certificates to automatically assign home devices into trust domains. Furthermore, conventional network architectures are not configured to implement SDN to dynamically organize the trust domains for home networks in particular.

Figure 8:
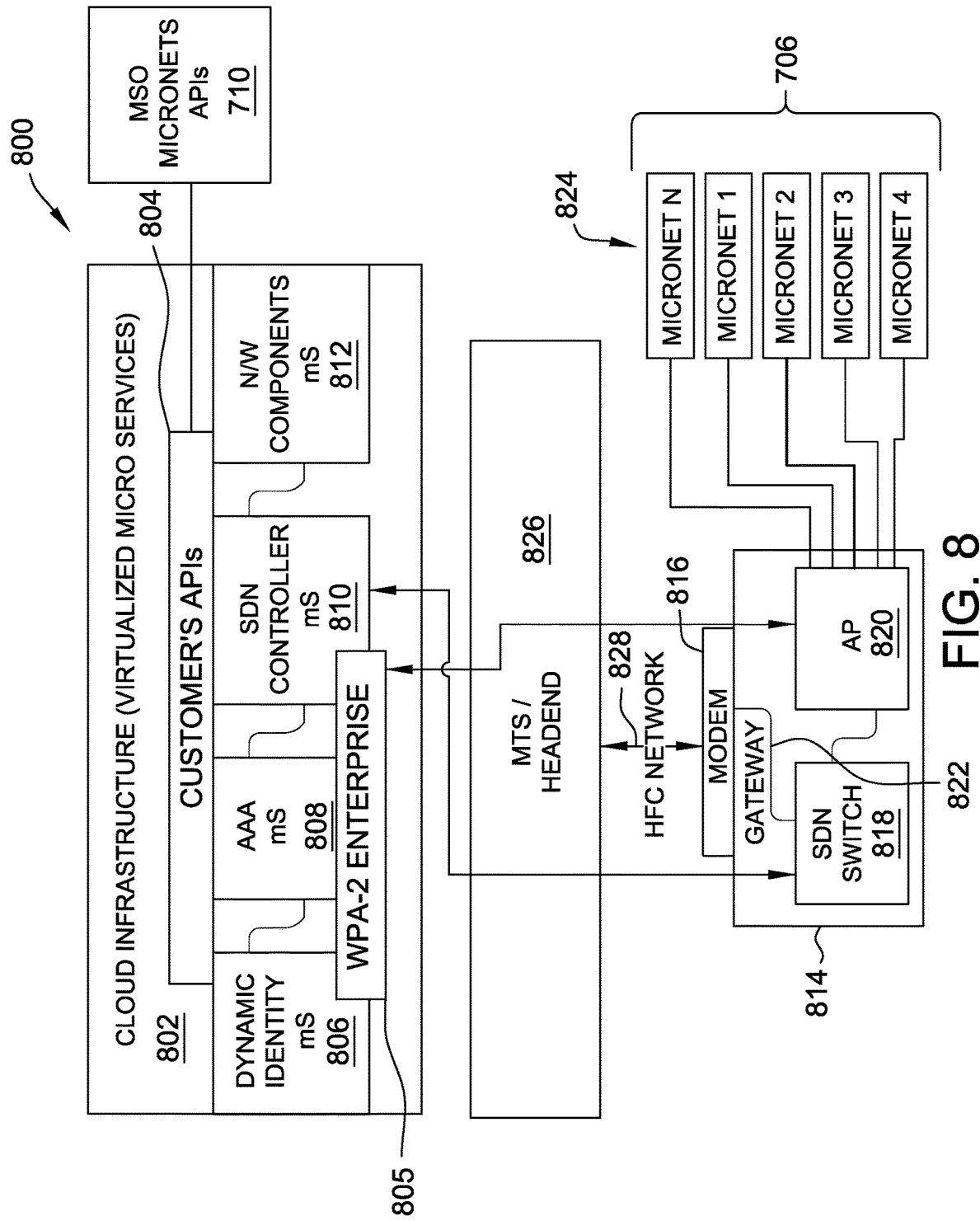
FIG. 8 is a schematic illustration of an exemplary architecture for the micronetwork management system depicted in FIG. 7.

FIG. 8 is a schematic illustration of an exemplary architecture 800 for micronetwork management system 700, FIG. 7. In an exemplary embodiment, architecture 800 includes a Cloud infrastructure 802, which enables in-home service for electronic device 702 (not shown in FIG. 8) by in-home subsystem 706. Cloud infrastructure 802 includes one or more customer APIs 804 and a server 805 configured to authenticate device 702 through in-home subsystem 706. Server 805 may, for example, be a Wi-Fi Protected Access 2 (WPA2) Enterprise server, using an IEEE 802.1X protocol, enterprise-grade authentication, and pre-shared keys (PSK) for use by in-home subsystem 706. In some embodiments, server 805 enables authentication to either a wired or wireless network, and may further implement Temporal Key Integrity Protocol (TKIP) and/or Advanced Encryption Standard (AES) encryption.

In an embodiment, customer APIs 804 are configured to interface with respective server components and/or API protocols of micronet API subsystem 710. Accordingly, in an exemplary embodiment, Cloud infrastructure 802 further includes respective modules for one or more of a dynamic identity microservice 806, an AAA microservice 808, an SDN controller microservice 810, and a network component(s) microservice 812, and in-home subsystem 706 is enabled to access one or more of these respective microservices upon authentication. In the example illustrated in FIG. 8, infrastructure 802 is shown to be Cloud-based, and microservices 806, 808, 810, 812 are shown to be virtualized. In alternative embodiments, infrastructure 802 operates according to similar functional principles, but need not be Cloud-based, and the respective microservices need not be virtualized, depending on the particular hardware versus software structure of the architecture.

In-home subsystem 706 includes a home network 814 having a modem 816, an SDN switch 818, and an AP 820. In an exemplary embodiment, SDN switch 818 enables a gateway 822 between modem 816 and AP 820, and AP 820 is configured to access one or more micronets 824 established within, or accessible by device 702 within the operation of in-home subsystem 706 (e.g., one or more isolated networks, as described above). Through the SDN switching techniques described above, gateway 822 advantageously enables home network to operably communicate with Cloud infrastructure 802 through SDN switch 818 and 820, or with a headend 826 (including, for example, a modem termination system (MTS) through modem 816 by way of a communication network 828. Communication network 828 may be a cable network, a fiber optic passive optical network (PON), or a hybrid fiber coaxial (HFC) network.

Figure 8A:
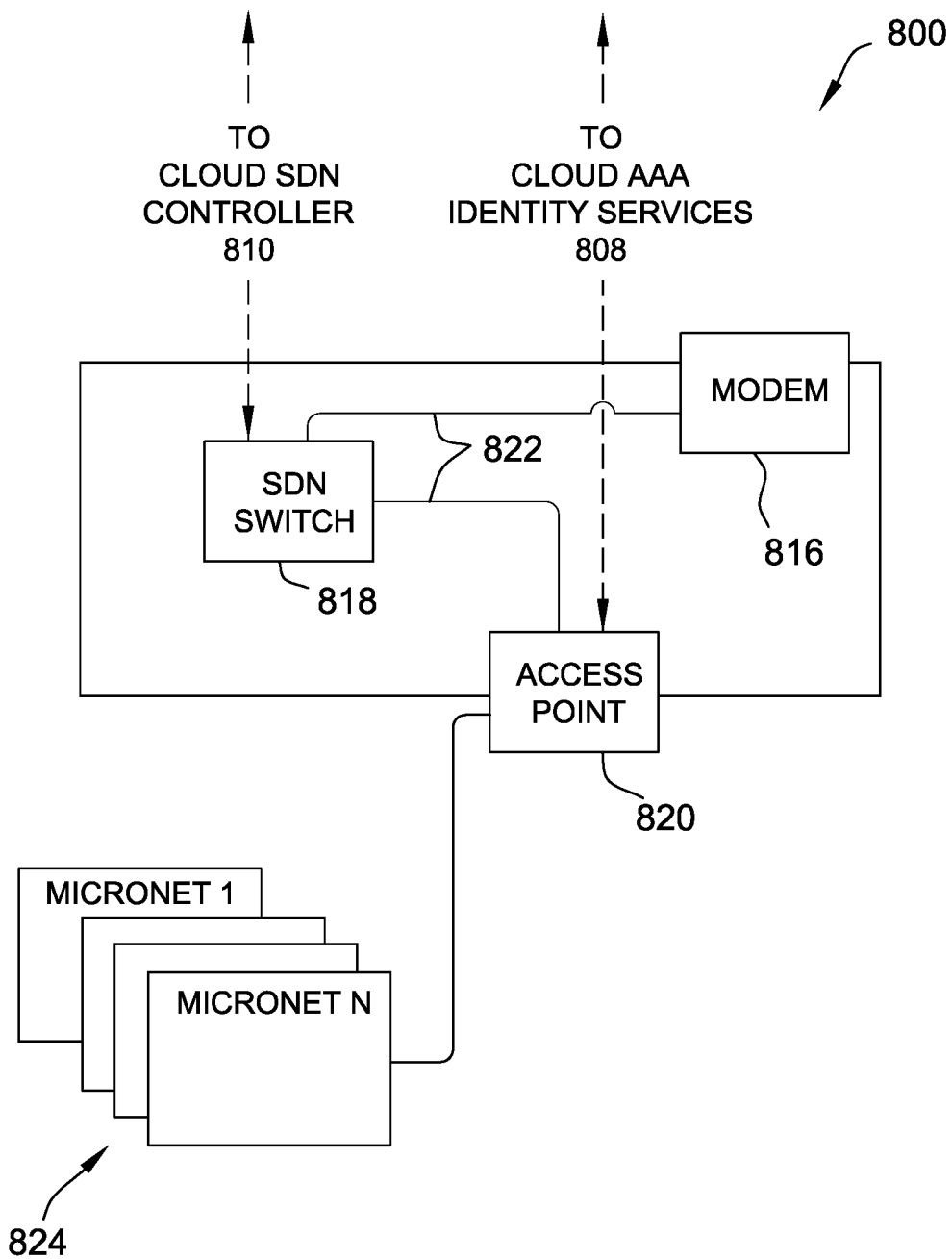
FIG. 8A is a close-up view of the home network of the architecture depicted in FIG. 8.

FIG. 8A is a close-up view of home network 814 of architecture 800, FIG. 8. FIG. 8A illustrates an exemplary embodiment in which, according to operation of SDN switch 818 and gateway 822, SDN switch 818 is enabled to operably communicate (e.g., directly) with SDN controller microservice 810 of Cloud infrastructure 802, and a AP 820 is enabled to similarly operably communicate with AAA microservice 808 (and/or dynamic identity microservice 806) of Cloud infrastructure 802.

According to the exemplary embodiments illustrated in FIGS. 8 and 8A, an innovative combination of different technologies is advantageously enabled to identify devices, such as through use of dynamic certificates, and automatically Matt the identified device(s) into one or more appropriate trust domains. As described herein, implementation of the trust domain utilizes SDN, which further advantageously provides the agile infrastructure (e.g., cloud infrastructure 802), which in turn secure connectivity both within and outside of home network 814. In at least one embodiment, an architecture 800 further includes an SDN controller (e.g., DSDN capable router 106, FIGS. 1A-C, step 314, FIG. 3) located in a cable network (e.g., communication network 828), within home network 814, within headend 826 (e.g., associated with a hub), or as a portion of Cloud infrastructure 802.

In some embodiments, the SDN switch is a standalone device or software module. In other embodiments, the SDN switch is an integral component of a Data over Cable Service Interface Specification (DOCSIS) device or network. In the exemplary embodiment, at least one API of micronet API subsystem 710 is configured to enable external service provider subsystem 704 to register device 702 (e.g., in processing 712) to users such that onboarding service within in-home subsystem 706 may be automated, and also automatically establish secure connectivity to external service provider subsystem 704. As described above, conventional techniques for managing trust within home networks typically require, for electronic devices utilizing an API, the device users to actively placed the device into the trust domain. According to the innovative systems and methods described herein though, user activity is greatly reduced or eliminated, through a novel use of certificates and dynamic certificates that automatically assign the home device into the respective trust domain, and particularly through use of SDN to organize the trust domains dynamically.

In at least some embodiments the certificates/dynamic certificates described above may include secure credentials, such as, X.509 certificates, which may be used for device authentication for both general purpose devices (e.g., smart phones, tablets, personal computers, etc.) and purpose-built devices (e.g., medical devices) which may not have user interface capability for making manual network selection and for manually entering credentials (such as username and password) for secure authentication.

A detailed description of schemes for automated network discovery and attachment of an external provider network by an electronic device are described in greater detail in co-pending U.S. patent application Ser. No. 15/419,853 filed Jan. 30, 2017, the disclosure of which is incorporated herein by reference in its entirety. However, where this previous application described novel two-stage authentication techniques for a multi-level network, the present embodiments feature innovative techniques for segregating the connected device into one or more micronets, we are each micronet may have own level of security access. Whereas this previous application describes device discovery of and attachment to existing multi-level external provider networks, the present embodiments describe the creation multiple micronets within a single home network environment. In this respect, the present systems and methods are fully compatible and complementary with this previous application.

In some embodiments, electronic device 702 includes an integral Wi-Fi module (not shown) having an embedded Wi-Fi chip, or alternatively, a separate and/or removable Wi-Fi module having a standard interface (e.g., USB, Ethernet, compact flash, etc.). In at least one embodiment, in the case where device 702 is a medical device, both an X.509 certificate, and additionally a medical device functionality certificate conforming to C4MI requirements for interoperability, may be used for authenticating device 702 either at external provider subsystem 704, or at in-home subsystem 706. The embodiments described above may also utilize Wi-Fi certificates (e.g., provisioned at manufacture of device 702, or by external provider subsystem 704) such as those compatible with Hotspot 2.0 or Passpoint implementations. Credential sets that may be compatible some or all of the embodiments described herein include, without limitation, device or user certificates such as Extensible Authentication Protocol (EAP), EAP Transport Layer Security (EAP-TLS), EAP-TTLS Password Authentication Protocol (PAP), Subscriber Identity Module (SIM) based credentials for mobile operators, such as EAP Subscriber Identity Module (EAP-SIM), EAP Authentication and Key Agreement (EAP-AKA), and EAP Authentication and Key Agreement prime (EAP-AKA').

At least some of the certificates described herein may be obtained from a Certificate Authority (CA) before device 702 may be certified to the trust domain of the respective micronet. Alternatively, a certificate may be pre-installed on device 702 at the time of manufacture (or provisioned by external service provider 704), and authentication of device 702 in use at in-home subsystem 706 includes a step of verifying the pre-installed certificate with the CA. Utilization of credential sets from a CA may advantageously further enable the system to mitigate "man-in-the-middle" attacks and malicious APs. CA utilization ensures that the device does not allow a user to bypass network authentication, or to accept an unknown CA certificate if compliant with the specifications of the trust domain. In some cases, certificates may also be authenticated using such protocols as Protocol for Carrying Authentication for Network Access (PANA), Hypertext Transfer Protocol (HTTP) over TLS (HTTPS), or Internet Protocol Security (IPsec), etc.

In some embodiments, the involvement of home deployment 4 purpose-built devices, when implemented according to an 802.11 specification, standard 802.11 MAC signaling protocols might support only one security paradigm per SSID. Accordingly, multiple SSIDs may be implemented to allow a combination different security paradigms. In other embodiments, reserved vendor proprietary fields are utilized to construct an equivalent scheme, which is then either standardized, or involves vendor proprietary procedures at the device and AP.

Figure 9:
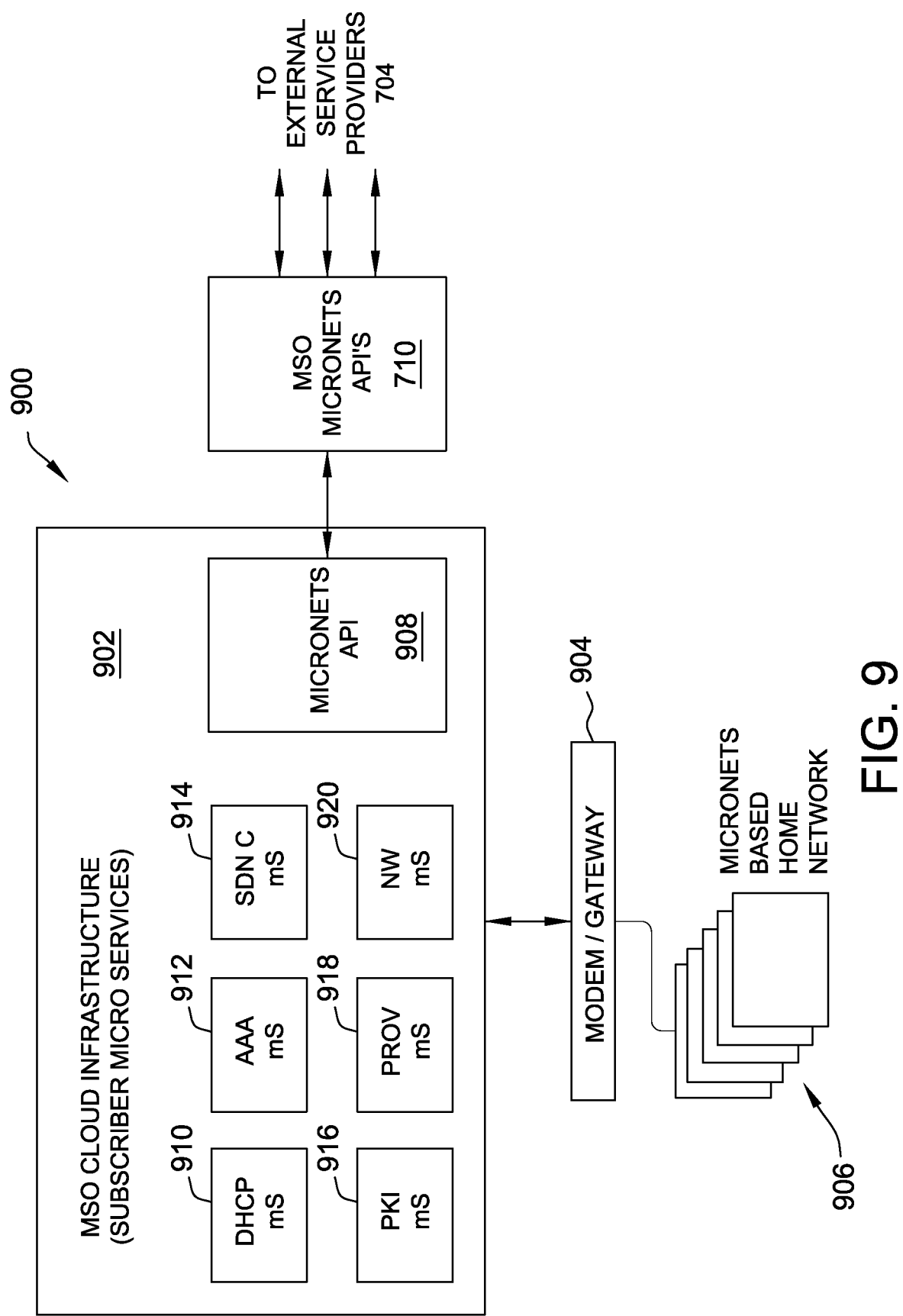
FIG. 9 is a schematic illustration of an alternative architecture for the micronetwork management system depicted in FIG. 7.

FIG. 9 is a schematic illustration of an alternative architecture 900 for micronetwork management system 700, FIG. 7. Architecture 900 is similar to architecture 800, FIG. 8, and may be implemented with respect to device 702, FIG. 7, except that architecture 900 is illustrated for a subscriber-based microservice paradigm, which need not include a separate communication network. Authentication and trust domain assignment of the device within architecture 900 may otherwise functions similarly to equivalent operations within architecture 800.

In an exemplary embodiment, architecture 900 includes a Cloud infrastructure 902, which enables in-home service for electronic device 702 (not shown in FIG. 9), through a modem/gateway 904, by a micronets-based home network 906. Home network 906 may be, for example, similar in structure and function to in-home subsystem 706, FIG. 7. Cloud infrastructure 902 includes one or more micronet APIs 908 configured to interface with respective server components and/or API protocols of micronet API subsystem 710. Accordingly, in an exemplary embodiment, Cloud infrastructure 802 further includes respective modules for one or more of a Dynamic Host Configuration Protocol (DHCP) microservice 910, an AAA microservice 912, an SDN controller microservice 914, a public key infrastructure (PKI) microservice 916, a provider microservice 918, and a network component(s) microservice 920. Similar to the embodiments described above, home network 906 is enabled to access one or more of these respective microservices upon authentication of device 702. This exemplary architecture is particularly useful in the case where a home network may be a private network, is not connected to the Internet, or is isolated or separate in at least some respects from the Internet or other electronic networks (e.g., cable or satellite service to a home).

The present embodiments are described above with respect to several components of a conventional cable and/or wireless/Wi-Fi networks. Optical networks though, are also contemplated within the scope of the present embodiments. Such optical networks may include, without limitation, an Optical Network Terminal (ONT) or Optical Line Termination (OLT), and an Optical Network Unit (ONU), and may utilize optical protocols such as EPON, RFOG, or GPON. Other types of communication systems our further contemplated, including communication systems capable of x-hauling traffic, satellite operator communication systems, MIMO communication systems, microwave communication systems, short and long haul coherent optic systems, etc.

X-hauling is defined herein as any one of or a combination of front-hauling, backhauling, and mid-hauling. In these additional embodiments, the MTS may include, without limitation, a termination unit such as an ONT, an OLT, a Network Termination Unit, a Satellite Termination Unit, a Cable MTS (CMTS), or other termination systems collectively referred to herein as "Modem Termination Systems (MTS)". Similarly, the modem described above may include, without limitation, a cable modem (CM), a satellite modem, an Optical Network Unit (ONU), a DSL unit, etc., which are collectively referred to herein as "modems." Furthermore, the DOCSIS protocol may be substituted with, or further include protocols such as EPON, RFoG, GPON, Satellite Internet Protocol, without departing from the scope of the embodiments herein.

Exemplary embodiments of systems and methods for establishing and managing micro nets for electronic devices are described above in detail. The systems and methods of this disclosure though, are not limited to only the specific embodiments described herein, but rather, the components and/or steps of their implementation may be utilized independently and separately from other components and/or steps described herein.

Although specific features of various embodiments of the disclosure may be shown in some drawings and not in others, this convention is for convenience purposes and ease of description only. In accordance with the principles of the disclosure, a particular feature shown in a drawing may be referenced and/or claimed in combination with features of the other drawings.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processor capable of executing the functions described herein. The processes described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term "processor."

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A micronetwork communication system, comprising:
a remote electronic subsystem in operable communication with an external provider network, the remote electronic subsystem configured to provide a first microservice and a second microservice different from the first microservice;
a local electronic subsystem (i) separate from the external provider network, (ii) in operable communication with the remote electronic subsystem, and (iii) including a local network, a first micronet and a second micronet different from the first micronet, wherein the first micronet is configured to operably interact with the first microservice, and the second micronet is configured to operably interact with the second microservice;
at least one electronic device configured to operably connect with one of the first micronet and the second micronet; and
a software defined network (SDN) controller disposed within one of the local electronic subsystem, the remote electronic subsystem, and the external provider network.

2. The micronetwork communication system of claim 1, further comprising an application programming interface (API) subsystem.

3. The micronetwork communication system of claim 2, wherein communication between the external provider network and the remote electronic subsystem is performed through the API subsystem.

4. The micronetwork communication system of claim 3, wherein the API subsystem comprises at least one of an application server, an authentication, authorization, and accounting (AAA) server, a Wi-Fi core unit, and a first access point (AP).

5. The micronetwork communication system of claim 4, wherein the remote electronic subsystem includes one or more client APIs configured to interface with the API subsystem.

6. The micronetwork communication system of claim 3, wherein the API subsystem is configured to implement an API protocol including at least one of a client server, a socket programming, a remote procedure call, a simple object access protocol, and a representational state transfer.

7. The micronetwork communication system of claim 1, wherein the remote electronic subsystem comprises at least one of the Internet, a Cloud-based network, a local area network, and a wide area network.

8. The micronetwork communication system of claim 1, wherein the home network comprises at least one of a modem, a software defined network (SDN) switch, and a second AP.

9. The micronetwork communication system of claim 8, wherein the home network further comprises a gateway in operable communication with the modem and the second AP, wherein the SDN switch is configured to enable operation of the gateway.

10. The micronetwork communication system of claim 8, wherein the SDN switch comprises one of a standalone device and a software module.

11. The micronetwork communication system of claim 10, wherein the SDN switch comprises a router.

12. The micronetwork communication system of claim 1, wherein the external provider network includes a cable network in operable communication with the local electronic subsystem.

13. The micronetwork communication system of claim 1, wherein the SDN controller comprises a dynamic SDN (DSDN) capable router.

14. The micronetwork communication system of claim 1, wherein the first microservice and the second microservice are virtual microservices.

15. The micronetwork communication system of claim 1, wherein the first microservice and the second microservice are subscriber-based microservices.

16. The micronetwork communication system of claim 1, wherein the at least one electronic device is enabled to access the first microservice and the second microservice by connecting with the first micronet.

17. The micronetwork communication system of claim 1, wherein the at least one electronic device is enabled to access only the first microservice, and not the second microservice, by connecting with the first micronet.

18. The micronetwork communication system of claim 1, wherein the at least one electronic device comprises at least one of a medical device, an electronic lock, an appliance, a smart phone, a computer, a tablet, audio/visual equipment, a camera, a weather station, a motion detector, a signaling device, a smart hub, an extender, and an Internet of Things device.

19. The micronetwork communication system of claim 1, wherein the in-home subsystem is configured to dynamically provision the at least one electronic device to at least one micronet trust domain based on a certificate installed on the at least one electronic device.

20. The micronetwork communication system of claim 19, wherein the certificate is one of (i) a dynamic certificate, (ii) an X.509 certificate, (iii) a C4MI certificate, (iv) a pre-installed certificate verified against a certificate authority, and (v) a certificate obtained from the certificate authority.

* * * * *